Patented Apr. 20, 1954

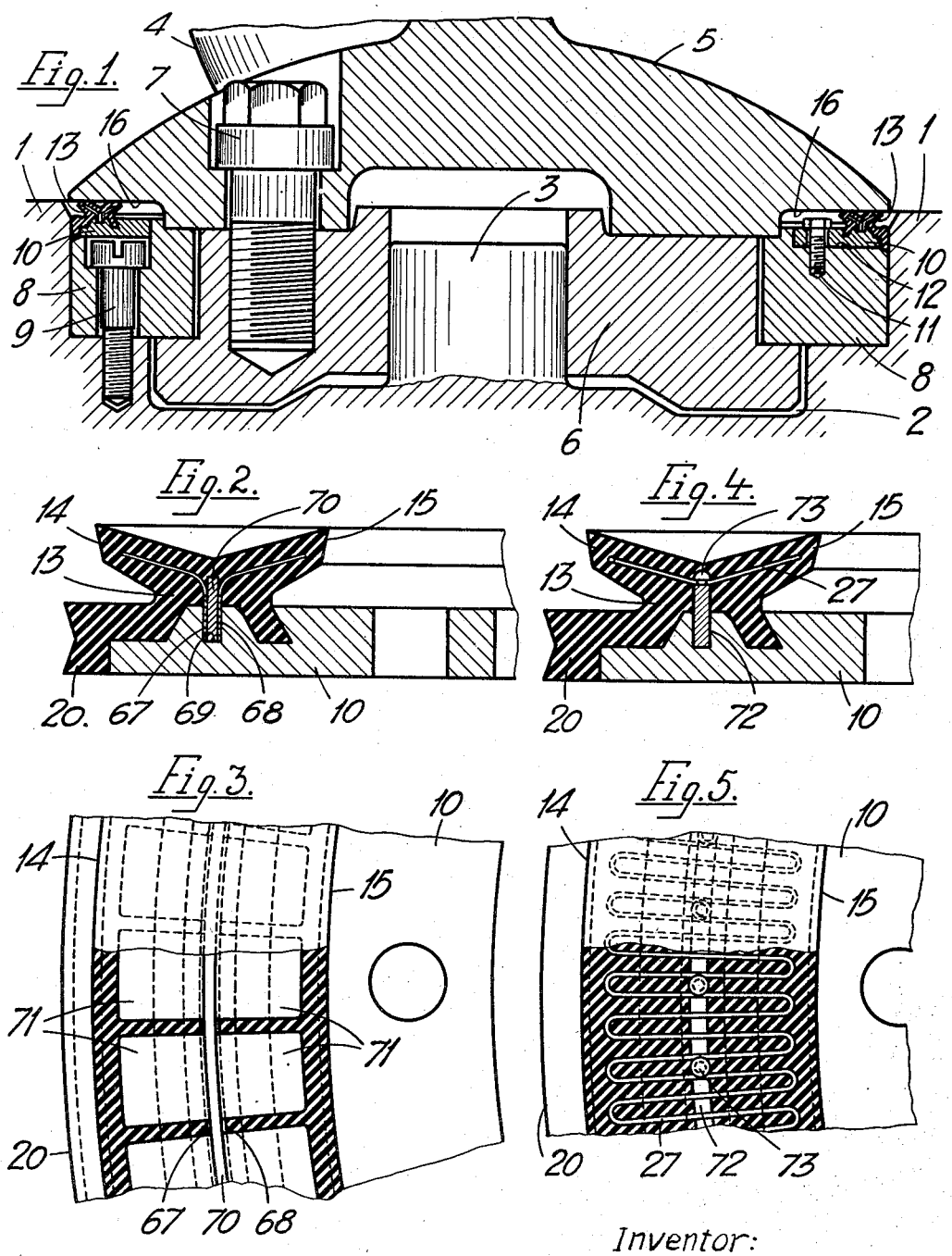

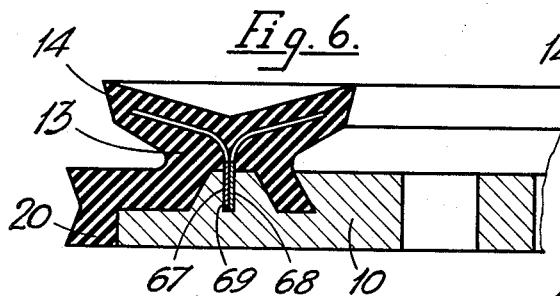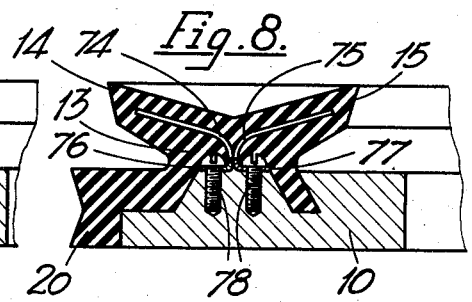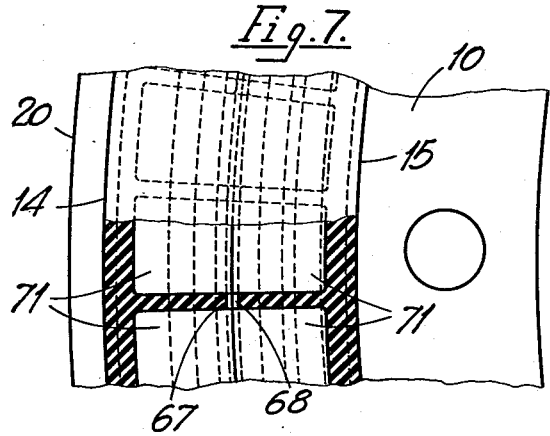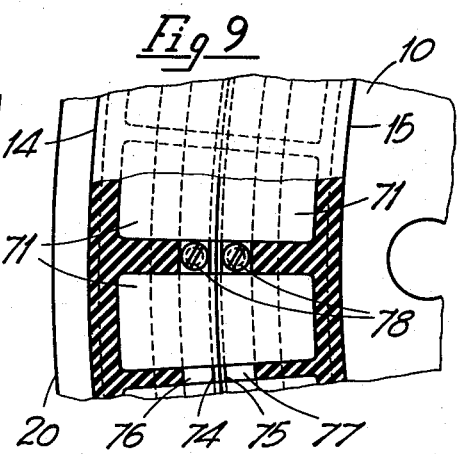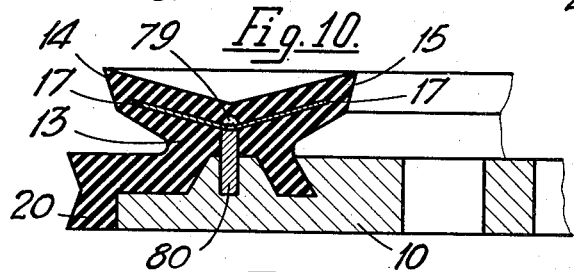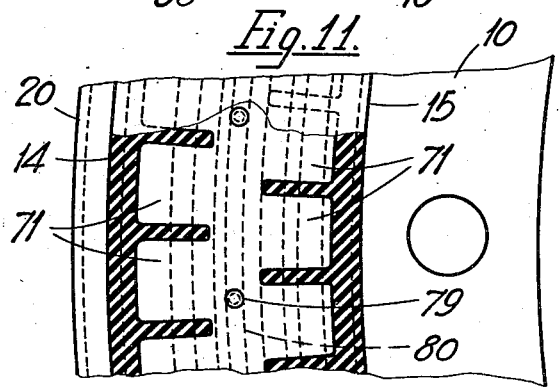

2,676,041

UNITED STATES PATENT OFFICE 2,676,041

PACKING FOR ROTATABLE SURFACES

John Elov Englesson, Kristinehamn, Sweden

Application June 27, 1947, Serial No. 757,424

Claims priority, application Sweden July 4, 1946

6 Claims. (Cl. 286—11.13)

In my co-pending application Serial No. 578,460, filed February 17, 1945, now Patent No. 2,516,191, I have described an improvement in packings of the kind which are adapted for use as a sealing device between sealing surfaces which are concentric to and relatively movable about an axis of rotation, such as a sealing surface on a hub body of a water turbine, a ship's propeller, a pump, or similar machinery operating in water, and a sealing surface on an adjustable blade rotatably mounted in said hub body, and which comprise sealing means positioned between said sealing surfaces and cooperating therewith, the essential characterizing feature of the said improved packings being that the said sealing means comprises a metallic supporting ring cooperating with one of the sealing surfaces, and a sealing ring of flexible material having a body portion united with the said supporting ring and having at least two annular sealing lips diverging from the body portion thereof towards the second sealing surface, the edge portions of said sealing lips remote from said body portion contacting with the said second sealing surface to provide a fluid-tight seal therewith, and a resilient reinforcing element embedded within said sealing ring and the sealing lips thereof and adapted to flexibly resist deflection of said sealing lips in a direction away from the second sealing surface with which they cooperate.

When the sealing means is placed in position between the sealing surfaces on the hub body and rotatable blade, the sealing lips on the sealing ring as well as the resilient reinforcing element embedded therein will be somewhat deflected in a direction towards the body portion of the sealing ring, and therefore, the sealing lips will be maintained in engagement with the cooperating sealing surface due to the elasticity of the material of said sealing lips and to the resiliency of the reinforcing element, and also by the pressure of the water acting on the outer sealing lip and by the oil pressure usually provided within the hub body, acting on the inner sealing lip.

It is an object of the present invention to provide a further improvement in packings of the kind above stated, with a view to considerably facilitate the manufacture of such packings, and also to reduce the risk of the elastic material of the sealing ring suffering a too great deformation if the packing is subjected to very high pressures, which may often occur, for instance, when the packing is used for propellers of submarine vessels in which case the water pressure can rise to 10 atmospheres and more.

With this object in view the present improvement consists in that the resilient reinforcing element which is embedded within the sealing ring and the sealing lips thereof, is rigidly attached to and supported by the metallic supporting ring.

The accompanying drawings illustrate by way of example a few constructional forms of the present invention. Fig. 1 shows a section through a portion of the hub of a ship's propeller and of a blade rotatably journalled therein, a packing according to the invention being provided between said hub and said blade. Fig. 2 shows to a larger scale a section of the sealing ring with its associate supporting ring before the said rings are placed in the hub, and Fig. 3 shows a fractional plan view, partly in section, of the sealing ring shown in Fig. 2. Fig. 4 shows a section similar to Fig. 2 of a modified construction of the sealing ring, of which Fig. 5 shows a fractional plan view partly in section. In a similar manner, Figs. 6 and 7 show a section and a fractional plan view, respectively, of a third constructional form, Figs. 8 and 9 show a fourth constructional form, and Figs. 10 and 11 show a fifth constructional form. In all constructional forms the same reference numerals are used for similar parts.

Referring to the constructional form illustrated in Figs. 1 to 3, inclusive, the reference numeral 1 denotes the hub body of an adjustable ship's propeller, said hub body being provided with a recess 2 for each adjustable propeller blade rotatably journalled therein. Provided in said recess 2, which is filled with oil, is a pivot or trunnion 3 which serves as a turning pivot for the propeller blade 4 which is provided with a flange 5. Placed in the recess 2 around the pivot 3 is a ring 6 to which the flange 5 of the propeller blade is secured by means of a number of heavy screw bolts 7. The said ring 6 is provided in a well-known manner with a crank pin, not shown in the drawing, for turning the ring 6 and thus the propeller blade 4 about the pivot 3. The ring 6 is retained in position by means of a clamping or retaining ring 8 which is secured to the hub body 1, as by means of a number of screw bolts 9. Upon adjustment of the blade 5 the members 4, 5 and 6 thus turn as a unit about the pivot 3 while the ring 8 remains stationary.

A supporting ring 10 of iron or other metal is attached by means of screws 11 to the sealing surface 12 on the retaining ring 8 in the hub. United to the supporting ring 10, as by being vulcanized thereto, is the body portion of a sealing ring 13 which is made of an elastic material, such as rubber or the like. On the side opposite to the supporting ring 10 the sealing ring is provided with two annular sealing lips 14 and 15 which engage the sealing surface 16 on the flange 5 of the propeller blade 4. The sealing lip 14 is directed outwards from the axis of rotation of the propeller blade, and the sealing lip 15 is directed inwards towards the said axis of rotation. Both lips are slightly inclined to the plane perpendicular to the axis of rotation, so that the cross section of the said two lips has approximately the shape of a considerably flattened letter V with a large obtuse angle between its legs, as shown in Fig. 2. The sealing ring 13 is provided at its outer circumference with a flange 20 which is united to the outer circumferential surface of the supporting ring 10 and which serves to provide a seal against the surrounding surface in the hub body 1.

Embedded within the rubber material of the sealing ring and the sealing lips thereof is an annular resilient reinforcing element which serves to support the said sealing lips 14 and 15 and increase the resiliency of the same. In the constructional form shown in Figs. 1 to 3 inclusive, the said reinforcing element comprises two rings 67 and 68 made of thin spring metal and having an angular cross section. The cylindrical portions of said spring rings 67 and 68 are inserted in an annular groove 69 in the supporting ring 10 and are retained therein by means of a cylindrical ring or wedge 70, which is driven into said groove 69 between the cylindrical portions of the rings 67 and 68. The composite resilient reinforcing element attached in this manner to the supporting ring 10, has a cross section in the shape of a flattened letter Y the legs of which form an obtuse angle, said legs representing the flaring edges of the two rings 67 and 68 which are embedded in the sealing lips 14 and 15 of the sealing ring 13. In order to increase the resiliency of the said edges of the rings 67 and 68, said edges may be divided by radial slots or the like into a plurality of resilient tabs or tongues 71, as shown in Fig. 3. The rings 67 and 68 as well as the ring 70 may be made in the form of whole undivided rings, or they may each be divided into several sections which together form a ring within the sealing ring.

In the manufacture of the sealing ring, the spring rings 67 and 68 and the wedge ring 70 are inserted in the groove 69 and attached to the supporting ring 10, before the rubber material is moulded around the said rings and is vulcanized thereto. In this way the manufacture of the sealing ring is greatly facilitated. It will also be understood that due to the fact that the resilient reinforcing element is rigidly attached to the supporting ring and supported thereby, the risk of the sealing ring being deformed if subjected to very high pressures, is materially reduced.

Figs. 4 and 5 illustrate a further constructional form which is an improvement of the constructional form illustrated in Figs. 5 and 6 of my Patent No. 2,516,191 above referred to. The reinforcing element which is embedded in the sealing ring 13 and in the sealing lips 14 and 15 thereof, is in this case formed of a flexible metal wire 27 bent in zigzag form in such manner that the bends of the wire form the outer and inner edges of a ring having the cross-sectional shape of a flattened letter V. This wire ring 27 is supported by a cylindrical ring 72 which is inserted in an annular groove in the metal supporting ring 10. The wire ring 27 is secured to said cylindrical ring 72 by suitable means, such as rivets 73.

Figs. 6 and 7 illustrate a constructional form which is similar to that illustrated in Figs. 2 and 3, with the exception that in this case the cylindrical ring or wedge 70 is omitted, the cylindrical portions of the two spring rings 67 and 68 being inserted in a narrow slot 69 in the supporting ring 10, of sufficient width to accommodate said cylindrical portions of the rings which may be retained therein by any suitable means, as by forcing the adjoining portions of the supporting ring 10 against one another by a rolling operation or the like. Also in this case the flaring portions of the two rings 67 and 68 may be divided by radial slots into a plurality of resilient tabs or tongues 71.

In the constructional form illustrated in Figs. 8 and 9, the reinforcing element embedded in the sealing ring 13 and in the sealing lips 14 and 15 thereof, comprises two rings 74 and 75 made of thin spring metal and having a substantially angular or hook-shaped cross section with the bends of the rings directed towards one another. The lower edges of said rings 74 and 75 are bent outwards away from one another to form flanges 76 and 77, respectively, which are secured by means of screws 78 to the metal supporting ring 10. Also in this case the upper flaring portions of the rings 74 and 75 which are embedded in the sealing lips 14 and 15, may be slotted to form a plurality of resilient tabs 71.

The constructional form illustrated in Figs. 10 and 11 is an improvement of the constructional form illustrated in Figs. 3 and 4 of my Patent No. 2,516,191 above referred to. The reinforcing element embedded in the sealing lips 14 and 15 of the sealing ring 13 consists of a ring 17 made of thin spring metal and having the cross-sectional shape of a flattened letter V the legs of which form an obtuse angle, said legs representing the edges of the ring 17. This spring ring 17 is attached, as by means of rivets 79, to a cylindrical ring 80 which is forced into an annular groove in the metal supporting ring 10. The edges of the ring 17 may be slotted to form a plurality of resilient tabs 71.

It will be understood that the invention is not limited to the constructional forms above described and illustrated in the accompanying drawings, and that various changes and modifications may be made therein within the scope of the following claims.

I claim:

1. A packing adapted for use as a sealing device between sealing surfaces relatively movable about an axis of rotation, said packing comprising in combination a metallic supporting ring provided with a recess, a sealing ring of flexible material having a body portion in abutment with said supporting ring, said sealing ring having at least two annular sealing lips diverging from said body portion thereof towards the sealing surface, the outer portions of both of said sealing lips remote from said body portion contacting with said sealing surface movable about an axis of rotation to effect a fluid-tight seal therewith, and a metallic resilient reinforcing element embedded within said sealing ring and said sealing lips thereof and extending in said sealing lips in the general direction of said sealing surface so as to flexibly resist deflection of said sealing lips in a direction away from said sealing surface, a portion of the said reinforcing element being secured in said recess in said metallic supporting ring, whereby said resilient reinforcing element is firmly secured through a metallic connection to said supporting ring to resist relative movement between said supporting ring and said sealing ring in the direction of rotation of said sealing surface 2. A packing adapted for use as a sealing device between sealing surfaces relatively movable about an axis of rotation, said packing comprising in combination a metallic supporting ring provided with an annular groove, a sealing ring of flexible material having a body portion in abutment with said supporting ring, said sealing ring having at least two annular sealing lips diverging from said body portion thereof towards the sealing surface, the outer portions of both of said sealing lips remote from said body portion contacting with said sealing surface movable about an axis of rotation to effect a fluid-tight seal therewith, and a metallic resilient reinforcing element embedded within said sealing ring and said sealing lips thereof and extending in said sealing lips in the general direction of said sealing surface so as to flexibly resist deflection of said sealing lips in a direction away from said sealing surface, said reinforcing element comprising a cylindrical portion at an angle to the portion extending in said sealing lips, said cylindrical portion being inserted into and secured in said annular groove of said metallic supporting ring, whereby said resilient reinforcing element is firmly secured through a metallic connection to said supporting ring to resist relative movement between said supporting ring and said sealing ring in the direction of rotation of said sealing surface.

3. A packing adapted for use as a sealing device between sealing surfaces relatively movable about an axis of rotation, said packing comprising in combination a metallic supporting ring provided with an annular groove, a sealing ring of flexible material having a body portion in abutment with said supporting ring, said sealing ring having at least two annular sealing lips diverging from said body portion thereof towards the sealing surface, the outer portions of both of said sealing lips remote from said body portion contacting with said sealing surface movable about an axis of rotation to effect a fluid-tight seal therewith, and a metallic resilient reinforcing element embedded within said sealing ring and said sealing lips thereof and extending in said sealing lips in the general direction of said sealing surface so as to flexibly resist deflection of said sealing lips in a direction away from said sealing surface, said reinforcing element comprising two flexible metal rings positioned one inside the other, each of said rings having a cylindrical portion at an angle to the portion extending in said sealing lips, said cylindrical portions of said rings being inserted into and secured in said annular groove in said metallic supporting ring, whereby said resilient reinforcing element is firmly secured through a metallic connection to said supporting ring to resist relative movement between said supporting ring and said sealing ring in the direction of rotation of said sealing surface.

4. A packing as defined in claim 3, in which the portion of said flexible metal ring extending in said sealing lips is formed with a plurality of tongues.

5. A packing adapted for use as a sealing device between sealing surfaces relatively movable about an axis of rotation, said packing comprising in combination a metallic supporting ring provided with an annular groove and adapted to be rigidly attached and sealed to one of said sealing surfaces, a sealing ring of flexible material having a body portion united with said supporting ring, said sealing ring having at least two annular sealing lips diverging from said body portion thereof towards the second sealing surface, the outer edge portions of said sealing lips remote from said body portion contacting with said second sealing surface to effect a fluid-tight seal therewith, a resilient reinforcing element embedded within said sealing ring and said sealing lips thereof and adapted to flexibly resist deflection of said sealing lips in a direction away from said second sealing surface, said reinforcing element having a cross-sectional configuration conforming substantially to that of said sealing lips and comprising two flexible metallic rings positioned one inside the other and each having a substantially angular cross section, each of said rings having a substantially cylindrical portion inserted into and secured in said annular groove in said metal supporting ring and a flange-like portion forming an angle with said cylindrical portion of the ring and extending in a direction away from the other of said rings.

6. A packing adapted for use as a sealing device between sealing surfaces relatively movable about an axis of rotation, said packing comprising in combination a metallic supporting ring provided with an annular groove and adapted to be rigidly attached and sealed to one of said sealing surfaces, a sealing ring of flexible material having a body portion united with said supporting ring, said sealing ring having at least two annular sealing lips diverging from said body portion thereof towards the second sealing surface, the outer edge portions of said sealing lips remote from said body portion contacting with said second sealing surface to effect a fluid-tight seal therewith, a resilient reinforcing element embedded within said sealing ring and said sealing lips thereof and adapted to flexibly resist deflection of said sealing lips in a direction away from said second sealing surface, said reinforcing element having a cross-sectional configuration conforming substantially to that of said sealing lips and comprising two flexible metal rings positioned one inside the other and each having a substantially angular cross section, each of said rings having a substantially cylindrical portion inserted into and secured in said annular groove in said metal supporting ring and a wedge ring inserted into said groove in said metal supporting ring between said cylindrical portions of said flexible metal rings and a flange-like portion forming an angle with said cylindrical portion of the ring and extending in a direction away from the other of said rings.

References Cited in the file of this patent

UNITED STATES PATENTS

| Number | Name | Date |
|---|---|---|
| 1,577,732 | Lamb | Mar. 23, 1926 |
| 1,924,555 | Hubbard | Aug. 29, 1933 |
| 2,013,903 | Thaheld | Sept. 10, 1935 |
| 2,237,758 | Kurzweil | Apr. 8, 1941 |
| 2,267,930 | Leonard | Dec. 30, 1941 |
| 2,309,446 | Ekkebus | Jan. 26, 1943 |
| 2,402,114 | Le Clair | June 11, 1946 |
| 2,516,191 | Englesson | July 25, 1950 |

FOREIGN PATENTS

| Number | Country | Date |
|---|---|---|
| 541,336 | Great Britain | Nov. 24, 1941 |